United States Patent Office 3,285,989
Patented Nov. 15, 1966

3,285,989
ISOPRENE SODIUM TREATMENT PROCESS
John Samuel Brooks Wolfe, Broadview Heights, and Henry Kahn, Grafton, Ohio, assignors to Goodrich-Gulf Chemicals, Inc., Cleveland, Ohio, a corporation of Delaware
No Drawing. Filed Dec. 28, 1964, Ser. No. 421,666
6 Claims. (Cl. 260—681.5)

This invention relates to the purification of crude, impure isoprene and more particularly to a new and improved process for the treatment of isoprene monomers with sodium to remove certain polymerization inhibitors therefrom.

A sodium treatment process for purification of crude or commercial isoprene, obtained from known hydrocarbon conversion methods, to remove polymerization inhibitors such as, for example, straight chain acetylenes, alpha-acetylenes and cyclopentadiene-1,3 is disclosed in United States Patent No. 2,935,540, issued May 3, 1960, to John S. B. Wolfe. It is necessary, if successful and optimum polymerization of the isoprene monomer is to be obtained, that the percentage of inhibitors in the monomer be reduced to less than about one-tenth percent.

The process disclosed by Wolfe, and commonly used in commercial practice, includes the steps of preparing a collodial suspension of finely divided sodium in a hydrocarbon medium; mixing the sodium colloidal suspension in an inert atmosphere, with the crude, impure isoprene monomer product of an ordinary hydrocarbon conversion process in a ratio of about two times the molar equivalent of sodium to the inhibitors to be reacted and removed thereby and agitating the mixture for about two hours, at a temperature preferably about 29° C. to ensure effective reaction with the sodium; and, then, filtering the sodium treated isoprene mixture, as in a leaf type, pressure filter, to remove the unreacted sodium metal and the sodium reaction products. After filtration, the isoprene is then treated to remove the 2-butyne, ultimately, by admixture with molecular sieves (crystalline, dehydrated zeolites) having a channel diameter of about 5 Angstrom units.

This sodium treatment process has proven unsatisfactory because of ignition and danger of ignition of unreacted sodium trapped on the filter, during the cleaning of the filter, which is required periodically in order to maintain filtering pressure within an operable range, and because the metallic sodium trapped on the filter causes a marked increase in sodium concentration, relative to the isoprene passing through the filter, resulting in the possibility that the sodium would act as a catalyst causing premature run-away polymerization of the isoprene.

Accordingly, the general object of this invention is to provide a new and improved sodium treatment process for the removal of polymerization inhibitors from diolefins and more particularly for the removal of alpha-acetylenes and cyclopentadiene-1,3 from crude, impure isoprene monomer.

Another object of this invention is the provision of a new and improved sodium treatment process for purifying and removing inhibitors from crude, impure isoprene monomer, and the like, which is more efficient in operation; which is safer and less hazardous in practice than processes previously known; which reduces the possibility of premature, run-away polymerization during treatment; and, which is economical and practical for competitive production use.

A still further object of this invention is to provide a new and improved sodium treatment process for removing polymerization inhibitors from diolefin monomers, such as the removal of alpha-acetylenes from isoprene, attaining one or more of the objects hereinbefore set forth.

These and other objects and advantages of this invention will appear from the following description thereof.

Briefly, the instant invention comprises a new and improved sodium process treatment for removing alpha-acetylenes and other sodium reactive inhibitors from crude, impure isoprene monomer, and the like, while greatly reducing, if not eliminating, hazard due to fire common to ordinary isoprene sodium treatment processes and the possibility of premature polymerization catalyzed by the treating metal, while achieving increased efficiency of inhibitor removal and cost and economy of operation.

More particularly, in a conventional manner, the crude, impure isoprene monomer is treated by admixture of sodium, dispersed in a hydrocarbon medium in a sodium treatment reactor at a temperature of 29° C., and agitation of the sodium-isoprene mixture in the reactor for about two hours during which time the sodium reacts with the inhibitors, such as the alpha-acetylenes and cyclopentadiene-1,3, to form insoluble reaction products.

After the reaction is complete the unreacted metallic sodium and the sodium reaction products are separated from the reaction mixture.

According to the precepts of this invention, separation of the sodium and sodium reaction products from the isoprene-sodium slurry reaction mixture is accomplished by flashing the isoprene from the mixture, at a temperature substantially above the boiling point of isoprene. Flashing, as well as mixing and reaction, is accomplished in an inert, dry atmosphere to prevent premature polymerization of the isoprene or oxidation of the sodium metal, such as carbon dioxide, nitrogen, or the like.

More particularly, isoprene sodium slurry reaction mixtures, obtained by any desired method, such as that set forth above, are separated, in acordance with this invention, by discharging the reaction mixture into a jacketed, heated vessel or tank containing an inert, dry, high boiling temperature liquid, which is chemically inactive with the sodium and isoprene in the reaction slurry and is of sufficiently high boiling temperature, relative to the flashing temperature, that it does not flash with or instead of the isoprene, does not break down and does not form azeotopes therewith.

Mineral oil has been found useful for such a purpose and has the further advantage of immediately coating the unreacted sodium metal, as the reaction mixture enters the flasher, thereby chemically insulating the sodium against further reaction. The mineral oil is heated to a preselected temperature according to the precepts set forth above in a range from about 70° C. to 110° C., for example, 100° C. At such temperatures the isoprene flashes quickly and rapidly, as soon as the reaction mixture enters the flasher, and the residue is entrapped in the mineral oil and maintained safely out of contact with the isoprene. Other inert media such as, for example, melted paraffin wax or petrolatum may be used instead of mineral oil if desired.

This not only prevents hazards due to the reaction of the free sodium metal but also prevents any such concentration of the sodium vis-a-vis the isoprene, during the separation process, as would catalyze a premature polymerization. Protection against premature polymerization also results from maintenance of a relatively low concentration of the sodium isoprene mixture (reaction mixture) vis-a-vis the volume of hot mineral oil used in the flasher.

Following flashing the isoprene is immediately led through a condenser into a receiving tank and is ready for further treatment to remove the butyne-2 inhibitors in accordance with prior practice.

The slurry from the flasher is withdrawn at the end of each batch, or at a desired predetermined contaminant level, and treated in a conventional manner, as by burning or with alcohol, to destroy the metallic sodium and to recover the oil for reuse. Alternatively, the residue in the flasher may be treated with water to remove the free sodium without reactivating the sodium reactive inhibitors.

If desired, the reaction mixture may be cooled after reaction is completed to prevent polymerization during the relay incident to forcing the mixture into the flasher. The new process does not cause polymerization of the isoprene, as is common in distillation, because the rapidity of the flashing and withdrawal and condensation of the isoprene does not provide sufficient time, at the flashing temperature, for polymerization.

*Example 1*

A two-hundred-gallon batch of crude, impure isoprene monomer, was placed in a reactor and treated at 29° C. with a conventional sodium dispersion. After two hours in the reactor, the mixture was withdrawn and the isoprene continuously flashed from the reaction mixture at a temperature of about 85° C. in an inert atmosphere of carbon dioxide, and then continuously passed through 5 Angstrom molecular sieves to remove the butyne-2 inhibitor.

Isoprene recovery upon completion of the dual treatment and condensation was about 95% and the alpha-acetylene, butyne-2, and cyclopentadiene-1,3 content of the crude isoprene monomer was reduced from 0.28, 0.83 and 0.13 mole percent to 0.05, 0.062 and 0.01 mole percent, respectively. The sodium sludge in the flasher was subsequently inactivated with water and there was no danger or hazard from fire or the like due to unreacted sodium metal and there was no concentration of sodium metal relative to isoprene which could catalyze a premature, run-away, polymerization.

*Example 2*

1,000 gallons of crude isoprene was flashed at 80° C. as set forth in Example 1, above, and again isoprene recovery after the dual treatment was about 95% and alpha-acetylene content was reduced from 0.014 mole percent to none and there was no danger or hazard from fire or the like due to unreacted sodium metal and there was no concentration of sodium metal relative to isoprene which could catalyze a premature, run-away, polymerization.

*Example 3*

A second batch of 1,000 gallons of crude isoprene was flashed at 100° C. as set forth in Example 1, above, and again isoprene recovery after the dual treatment was about 95% and alpha-acetylene content was reduced from 0.014 mole percent to none and there was no danger or hazard from fire or the like due to unreacted sodium metal and there was no concentration of sodium metal relative to isoprene which could catalyze a premature, run-away, polymerization.

Modifications, changes and improvements to the forms of the invention herein particularly disclosed and described may occur to those skilled in the art who come to understand the principles and precepts thereof. Accordingly, the scope of the patent issued hereon should not be limited to the specific forms of the invention herein particularly disclosed and described but only consistent with the advance by which the invention has promoted the art.

We claim:
1. In a process for treating diolefin monomers with sodium to remove polymerization inhibitors therefrom, including the steps of admixing a sodium metal dispersion of sodium metal in an organic dispersion medium with the crude diolefin monomer, retaining the dispersion and monomer in admixture while reacting the sodium with the sodium reactive inhibitors, and separating the unreacted sodium and sodium reaction products from the reaction mixture, the improvement wherein said diolefin monomer is flashed from said reaction mixture in a heated, moisture free organic liquid bath having a boiling point substantially above the flashing temperature of said diolefin monomer and being inert and unreactive with sodium metal, said diolefin monomer, and said sodium reaction products.

2. The process according to claim 1 wherein said diolefin is isoprene.

3. The process according to claim 1 wherein said organic liquid bath comprises mineral oil.

4. The process according to claim 3 in which said mineral oil bath is at a temperature of about 100° C.

5. The process according to claim 2 wherein said inert atmosphere is carbon dioxide.

6. The process according to claim 2 wherein said isoprene monomer is flashed from said reaction mixture at a temperature of from about 80° C. to about 110° C.

References Cited by the Examiner

UNITED STATES PATENTS

| | | | |
|---|---|---|---|
| 2,927,074 | 3/1960 | Barger et al. | 208—208 |
| 2,935,540 | 5/1960 | Wolfe | 260—681.5 |
| 3,070,641 | 12/1962 | Herndon et al. | 260—681.5 |
| 3,091,653 | 5/1963 | Nogradi | 260—681.5 |

DELBERT E. GANTZ, *Primary Examiner.*

G. E. SCHMITKONS, *Assistant Examiner.*